United States Patent
Alshina et al.

(10) Patent No.: US 8,064,711 B2
(45) Date of Patent: Nov. 22, 2011

(54) METHOD AND APPARATUS FOR COMPRESSING IMAGE SIGNAL

(75) Inventors: Elena Alshina, Suwon-si (KR);
Alexander Alshin, Suwon-si (KR);
Ekaterina Nesterova, Suwon-si (KR);
Maxim Koroteev, Suwon-si (KR);
Vadim Seregin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 12/243,204

(22) Filed: Oct. 1, 2008

(65) Prior Publication Data
US 2009/0110317 A1   Apr. 30, 2009

(30) Foreign Application Priority Data
Oct. 24, 2007   (KR) .................. 10-2007-0107442

(51) Int. Cl.
*G06K 9/36* (2006.01)
(52) U.S. Cl. ..................................... 382/250
(58) Field of Classification Search .......... 382/232–251, 382/166, 276–277; 708/400–408; 358/539, 358/426.01–426.16; 375/240.01–240.29
See application file for complete search history.

(56) References Cited

U.S. PATENT DOCUMENTS

| | | | | |
|---|---|---|---|---|
| 6,178,269 B1 * | 1/2001 | Acharya | | 382/277 |
| 6,865,291 B1 * | 3/2005 | Zador | | 382/166 |
| 7,142,720 B1 * | 11/2006 | Fukuda et al. | | 382/232 |
| 7,555,510 B2 * | 6/2009 | Ju | | 708/402 |
| 7,689,052 B2 * | 3/2010 | Sullivan et al. | | 382/248 |
| 2011/0038555 A1 * | 2/2011 | Alshina et al. | | 382/233 |

FOREIGN PATENT DOCUMENTS

| | | |
|---|---|---|
| JP | 2004-326314 A | 11/2004 |
| JP | 2006-246455 A | 9/2006 |
| KR | 1994-7001621 A | 5/1994 |
| KR | 10-2007-0000744 A | 1/2007 |
| KR | 2007-011148 A | 1/2007 |
| WO | 92/022166 A1 | 12/1992 |

* cited by examiner

*Primary Examiner* — Ishrat I Sherali
(74) *Attorney, Agent, or Firm* — Sughrue Mion, PLLC

(57) ABSTRACT

A method of compressing image signals, to provide more efficient compression than a discrete cosine transform (DCT) while having the least amount of overhead information is provided. A partial exchange between a row and a column of a transform matrix is performed by applying several values to a parameter, which shows an extent of partial exchange between rows and columns of the transform matrix. When a value of the used angle parameter is stored or transmitted, an overhead increases. Processes generating a random sequence of the angle parameter, generating a compression coefficient matrix regarding each angle parameter of the generated random sequence, and calculating a compression rate are repeated to obtain an angle parameter with the highest compression rate. The angle parameter having the highest compression rate is not stored or transmitted, but a number in the random sequence of the corresponding angle parameter is obtained, and stored or transmitted.

21 Claims, 5 Drawing Sheets

4x4 TRANSFORM

8x8 TRANSFORM

METHOD AND APPARATUS FOR COMPRESSING IMAGE SIGNAL

CROSS-REFERENCE TO RELATED PATENT APPLICATION

This application claims priority from Korean Patent Application No. 10-2007-0107442, filed on Oct. 24, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to compressing an image signal, and more particularly, to compressing an image signal, so as to improve a compression rate by modifying a transform matrix.

2. Description of the Related Art

A discrete cosine transform (DCT) is a well-known technology that is used in video, image, or audio compression. In recent years, several attempts were made to develop a more efficient coding method, and due to this, in audio coding, parametric coding has shown better results than DCT. Regarding two-dimensional (2D) data, Karhunen Loeve transform (KLT) coefficients have the minimum bit interval, but the amount of overhead information remarkably increases.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of compressing an image signal, so as to provide a more efficient compression than a discrete cosine transform (DCT) while having the least amount of overhead information.

Regarding a parameter, which shows an extent of a partial exchange between rows and columns of a transform matrix of the present invention, a partial exchange between a row and a column of the transform matrix is performed by using several values. The parameter is referred to as an angle parameter in the present invention. Through such modification of the transform matrix, a more efficient compression coefficient matrix can be generated.

When a value of the used angle parameter is stored or transmitted, an overhead remarkably increases. However, in the present invention, the processes of generating a random sequence of the angle parameter, generating a compression coefficient matrix regarding each angle parameter of the generated random sequence, and calculating a compression rate are repeated in order to obtain an angle parameter that has the highest compression rate. Also, the angle parameter having the highest compression rate is not stored or transmitted, but a number in the random sequence of the corresponding angle parameter is obtained, and stored or transmitted.

According to an aspect of the present invention, there is provided a method of compressing an image signal, the method including: performing a partial exchange between rows and columns of a transform matrix; transforming an image signal that is to be compressed by using the transform matrix in which the partial exchange has been performed; compressing the transformed image signal; and selecting an angle parameter corresponding to the highest compression rate by repeating the performing of a partial exchange, the transforming of an image signal, and the compressing of the transformed image signal by applying several values to angle parameters showing extents of partial exchanges between rows and columns of the transform matrix.

The angle parameter may be an Euler angle.

The performing of a partial exchange may include multiplying a matrix corresponding to the partial exchange between rows to the left side of the transform matrix, and multiplying a matrix corresponding to the partial exchange between columns to the right of the transform matrix.

The matrix corresponding to the partial exchange between rows may be $$\begin{bmatrix} A & B & C & 0 \\ D & E & F & 0 \\ G & H & I & 0 \\ 0 & 0 & 0 & 1 \end{bmatrix},$$

where A=cos α cos γ−sin α cos β sin γ, B=−sin α cos γ−cos α cos β sin γ, C=sin β sin γ, D=cos α sin γ+sin α cos β cos γ, E=−sin α sin γ+cos α cos β cos γ, F=−sin β cos γ, G=sin α sin β, H=cos α sin β, and I=cos β, and α,β, and γ are Euler angles.

The selecting of an angle parameter corresponding to the highest compression rate may include: generating a random sequence in regards to the angle parameter; obtaining a compression rate of the image signal by performing of the partial exchange between the rows and columns, the transforming of an image signal, and the compressing of the transformed image signal on each value of the random sequence; obtaining the highest compression rate from among the obtained compression rates of each value of the random sequence; and selecting a value of the angle parameter corresponding to the highest compression rate.

The method further includes: obtaining a number of the value of the angle parameter corresponding to the highest compression rate in the random sequence; and storing or transmitting the image signal compressed by the highest compression rate and the corresponding number in the random sequence to a decoder.

The generated random sequence may be a Lemer pseudo-random number.

The selecting of the angle parameter corresponding to the highest compression rate may include repeating the performing of a partial exchange, the transforming an image signal, and the compressing of the transformed image signal by using a Monte Carlo method.

The Euler angle may have a value near 0° or near 180°.

According to another aspect of the present invention, there is provided an apparatus for compressing an image signal, the apparatus including: a row and column exchanger that performs a partial exchange between rows and columns of a transform matrix; a transformer that transforms an image signal that is to be compressed by using the transform matrix in which the partial exchange has been performed; an image compressor that compresses the transformed image signal; and a controller that selects an angle parameter corresponding to the highest compression rate by repeating the operations of the row and column exchanger, the transformer, and the image compressor, by applying several values to angle parameters showing extents of partial exchanges between rows and columns of the transform matrix.

The angle parameter may be an Euler angle.

The row and column exchanger may multiply a matrix corresponding to the partial exchange between rows to the left side of the transform matrix, and multiply a matrix corresponding to the partial exchange between columns to the right of the transform matrix.

The controller may generate a random sequence in regards to the angle parameter, obtain a compression rate of the image signal by operating the row and column exchanger, the transformer, and the image compressor for each value of the random sequence, obtain the highest compression rate from among the obtained compression rates of each value of the random sequence, and select a value of the angle parameter corresponding to the highest compression rate.

The controller may obtain a number of the value of the angle parameter corresponding to the highest compression rate in the random sequence, and store or transmit the image signal compressed by the highest compression rate and the corresponding number in the random sequence to a decoder.

The angle parameter corresponding to the highest compression rate may be selected by repeating the operations of the row and column exchanger, the transformer, and the image compressor by using a Monte Carlo method.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

In the exemplary embodiments of the present invention, partial exchanges between rows and columns of a discrete cosine transform (DCT) matrix are performed. Through such modification of the DCT matrix, a more efficient compression coefficient matrix can be generated. In the exemplary embodiments, a discrete cosine transform (DCT) and DCT matrix are utilized by way of example. However, the present invention is not limited thereto, and other transforms and transform matrices may be utilized.

Figure 1:
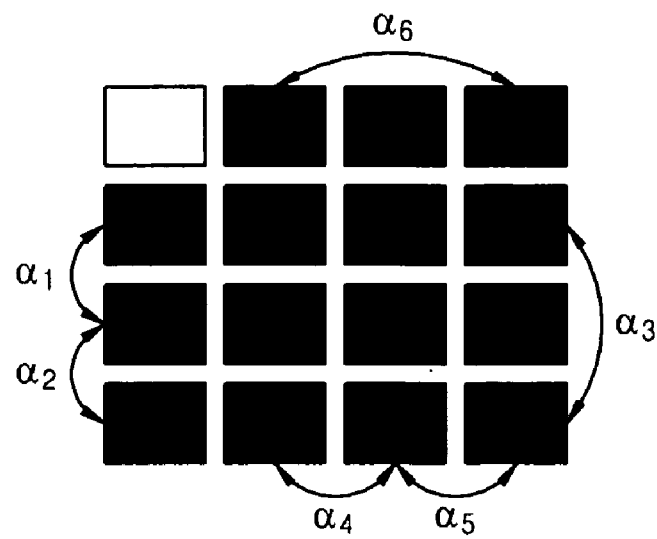
FIGS. 1 and 2 are diagrams for describing exchanges between rows and columns of a transform matrix.
Figure 2:
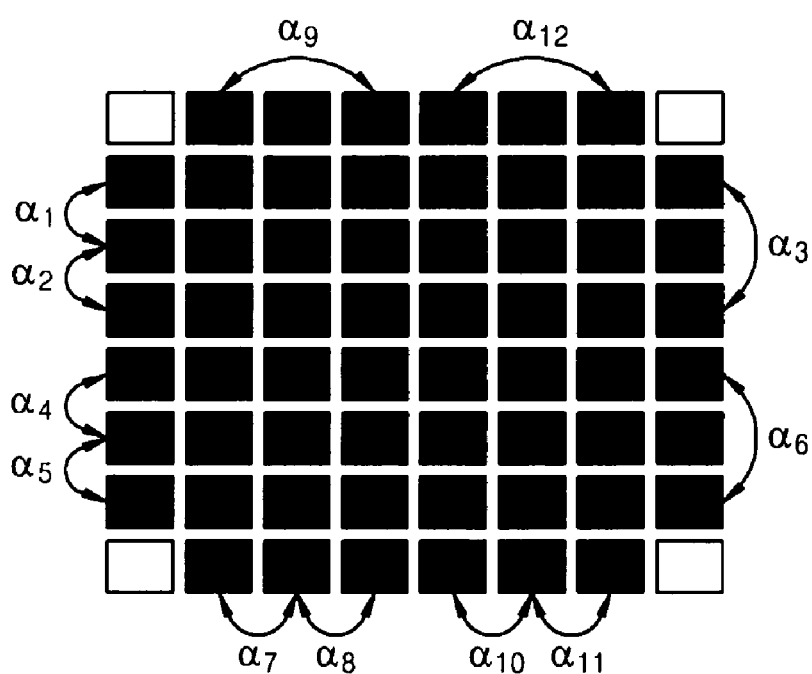

FIGS. 1 and 2 are diagrams for describing exchanges between rows and columns of a DCT matrix.

In the exemplary embodiments of the present invention, a partial exchange between rows means that rows are partially exchanged according to values of parameters, instead of exchanging the entire rows.

A row A and a row B can be exchanged according to a value of a parameter a as shown in Equation 1 below.

$$\text{row}A(\text{new}) = \cos(a)*\text{row}A(\text{old}) + \sin(a)*\text{row}B(\text{old})$$

$$\text{row}B(\text{new}) = -\sin(a)*\text{row}A(\text{old}) + \cos(a)*\text{row}B(\text{old}) \quad \text{Equation 1}$$

Referring to Equation 1, the parameter "a" acts as an angle. Accordingly, a parameter that shows an extent of a partial exchange between rows and columns of the DCT matrix is referred to as an angle parameter.

When the value of a parameter "a" is 0°, the exchange is not performed. Also, when the value of the parameter "a" is 90°, the entire rows are exchanged.

Also, when the value of the parameter "a" is larger than 90° and smaller than 180°, the rows are exchanged and a sign of an element is changed. When the value of the parameter "a" is 180°, the rows are not exchanged, but signs of elements included in each row are changed.

The partial exchange between columns can be defined in the same manner as the partial exchange between rows.

FIG. 1 illustrates a case of a 4×4 DCT matrix. Referring to FIG. 1, three parameters $\alpha_1$, $\alpha_2$, and $\alpha_3$ are used in exchanging rows, and three parameters $\alpha_4$, $\alpha_5$, and $\alpha_6$ are used in exchanging columns.

Also, FIG. 2 illustrates a case of an 8×8 DCT matrix. Referring to FIG. 2, six parameters $\alpha_1$, $\alpha_2$, $\alpha_3$, $\alpha_4$, $\alpha_5$, and $\alpha_6$ are used in exchanging rows and six parameters $\alpha_7$, $\alpha_8$, $\alpha_9$, $\alpha_{10}$, $\alpha_{11}$, and $\alpha_{12}$ are used in exchanging columns.

In FIG. 1, the results of exchanging the rows are different based on an order of applying the parameters $\alpha_1$, $\alpha_2$, and $\alpha_3$. In other words, the parameters $\alpha_1$, $\alpha_2$, and $\alpha_3$ are not independent from each other. A matrix value when the parameter $\alpha_1$ is applied first and then the parameter $\alpha_2$ is applied, and a matrix value when the parameter $\alpha_2$ is applied first and then the parameter $\alpha_1$ is applied are different.

It can be seen that the exchanges of the rows and columns are similar to rotation of a coordinate axis in a three-dimensional (3D) manner. In other words, three columns respectively correspond to X, Y, and Z axes on a 3D coordinate.

Even in the rotation of the coordinate axis in 3D, the result differs based on which axis is rotated first. Accordingly, several methods of showing rotation of a coordinate axis in 3D have been developed, and a representative method is Euler angles.

Figure 3:
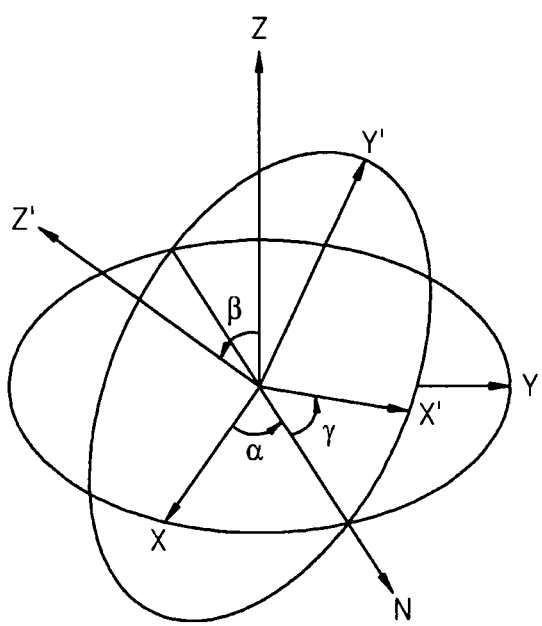
FIG. 3 is a diagram illustrating Euler angles.

FIG. 3 is a diagram illustrating Euler angles. Referring to FIG. 3, three angles $\alpha$, $\beta$, and $\gamma$ are Euler angles.

In FIG. 3, the X, Y, and Z axes indicate coordinate axes before rotation, and X', Y', and Z' axes indicate coordinate axes after rotation. An N axis is an intersection of an XY plane and an X'Y' plane. The N axis is referred to as a line of nodes.

The angle $\alpha$ is an angle between the X axis and the N axis having the Z axis as a rotation axis. The angle $\beta$ is an angle between the Z axis and the Z' axis having the N axis as a rotation axis. The angle $\gamma$ is an angle between the N axis and the X' axis having the Z' axis as a rotation axis.

When the rotation of a coordinate axis applying Euler angles is shown in a matrix form, it can be shown as Equation 2 below.

$$\begin{bmatrix} \cos\gamma & \sin\gamma & 0 \\ -\sin\gamma & \cos\gamma & 0 \\ 0 & 0 & 1 \end{bmatrix} \begin{bmatrix} 1 & 0 & 0 \\ 0 & \cos\beta & \sin\beta \\ 0 & -\sin\beta & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix} \quad \text{Equation 2}$$

A first matrix indicates rotation around the Z' axis, a second matrix indicates rotation around the N axis, and a third matrix indicates rotation around the Z axis.

In the exemplary embodiments of the present invention, the exchanges between the rows and columns may be shown in rotation of a coordinate axis using Euler angles.

Finding the optimal transform matrix for efficiently performing compression has a classical multi parameter problem having strong non-smooth dependence on parameters. A Monte Carlo method is used to solve such a problem. In the Monte Carlo method, a Lemer sequence number may be used to generate a random point. By using the Lemer sequence number, only one integer can be stored or transmitted instead of storing or transmitting an angle parameter used as a parameter. Accordingly, overhead required to inform a decoder about a used value of a parameter can be reduced.

In other words, items used in the exemplary embodiment are as follows.

1. An invertible transform of a DCT matrix
2. Rearrangement of energy for more efficient coding
3. Minimization of the amount of added information by using Lemer number Referring back to FIGS. 1 and 2, parts that are modified by the rotation are in black blocks and parts that are not modified are blank. In FIG. 1, six angle parameters modified 15 elements by rearranging energy between a row and a column. In FIG. 2, twelve angle parameters modified sixty elements.

Referring to FIG. 1, three angle parameters are required to exchange rows and three angle parameters are required to exchange columns. Accordingly, six angle parameters are required in a 4×4 block.

Referring to FIG. 2, six angle parameters are required to exchange rows and six angle parameters are required to exchange columns. Accordingly, twelve angle parameters are required in an 8×8 block.

The steps of the exemplary embodiments of the present invention will now be described.

First step: Orthogonal transform family parameterization
Second step: Monte Carlo method
Third step: Lemer pseudo-random numbers
Fourth step: Localization of diapason for optimal angle parameters
Fifth step: Quasi-optimal basis When the number of parameters added to improve the compression rate of a video signal is too large, it may be better to transmit the video signal without compression. For example, when sixteen additional parameters are required even if an image signal is compressed to a size almost near to 0 in a 4×4 block, video data is not needed to be compressed because this is same as transmitting sixteen pixel values to a decoder as parameters.

As such, it is preferable to compress an image signal while minimizing added overhead.

In the exemplary embodiments of the present invention, a transform for compressing video sequence is optimized by using the least amount of information.

<First Step: Orthogonal Transform Family Parameterization>

In order to optimize current data transform, a parameter group that intrinsically describes the basis needs to be determined. The basis is expressed by a transform matrix, and accordingly, the basis is modified by modifying the transform matrix.

The basis is modified mainly by rotating the basis. In the exemplary embodiments of the present invention, the basis is rotated by using an angle parameter. Rotation of the basis using the angle parameter in optimizing image transform is a novel technology. The angle parameter may be Euler angles. However, the angle parameter is not limited to Euler angles, and can be any parameter as long as the parameter shows an extent of partial exchanges between rows and columns of a matrix. The exemplary embodiments, hereinafter, use Euler angles.

In terms of transform optimization, the rotation of a Euler angle may be defined as Equation 3 below by using left multiplication ($R_{horizontal}$) and right multiplication ($R_{vertical}$) of a DCT matrix D.

$$D' = R_{horizontal} \times D \times R_{vertical} \quad \text{Equation 3}$$

Here, D' denotes a DCT matrix modified by the rotation.

A matrix $R_{horizontal}$ performs an exchange between rows of the DCT matrix D. A matrix $R_{vertical}$ performs an exchange between columns of the DCT matrix D.

In a 4×4 block, an example of the matrix $R_{horizontal}$ is as Equation 4 below.

$$R_{horizontal} = \begin{bmatrix} A & B & C & 0 \\ D & E & F & 0 \\ G & H & I & 0 \\ 0 & 0 & 0 & 1 \end{bmatrix}, \quad \text{Equation 4}$$

A=cos α cos γ−sin α cos β sin γ,
B=−sin α cos γ−cos α cos β sin γ,
C=sin β sin γ,
D=cos α sin γ+sin α cos β cos γ,
E=−sin α sin γ+cos α cos β cos γ,
F=−sin β cos γ,
G=sin α sin β,
H=cos α sin β,
I=cos β

Here, α, β, and γ are Euler angles.

Accordingly, in case of a 4×4 block, Euler angles modify fifteen DCT coefficients according to a group of six parameters $\alpha_1, \alpha_2, \ldots,$ and $\alpha_6$. In the case of an 8×8 block, twelve Euler angles $\alpha_1, \alpha_2, \ldots,$ and $\alpha_{12}$ modify sixty DCT coefficients. As such, the number of parameters for modifying a DCT matrix is reduced.

<Second Step: Monte Carlo Method>

After a degree of freedom is reduced to six angle parameters (in the case of an 8×8 block, twelve angle parameters), the data transform should be optimized in terms of saving bits. In other words, a method of selecting a group of angle parameters should be optimized.

At this time, high-dimensional domains (six or twelve angle parameters) of a parameter are used, and compression of an image non-smoothly depends on used parameters. Such problems are solved by using a Monte Carlo method.

The core of the Monte Carlo method is performing a plurality of attempts. In other words, a function value (in the exemplary embodiments of the present invention, a compression rate) is measured by using several points, and the best point is selected. In the Monte Carlo method, the quality of a random point in a high-dimensional domain is important, and the importance increases specifically as the number of dimensions increases. It is well known that at this time, a pseudo-random point is more preferable than a uniform grid point. A case of using the Monte Carlo method in 2D will now be described with reference to FIG. 4.

Figure 4:
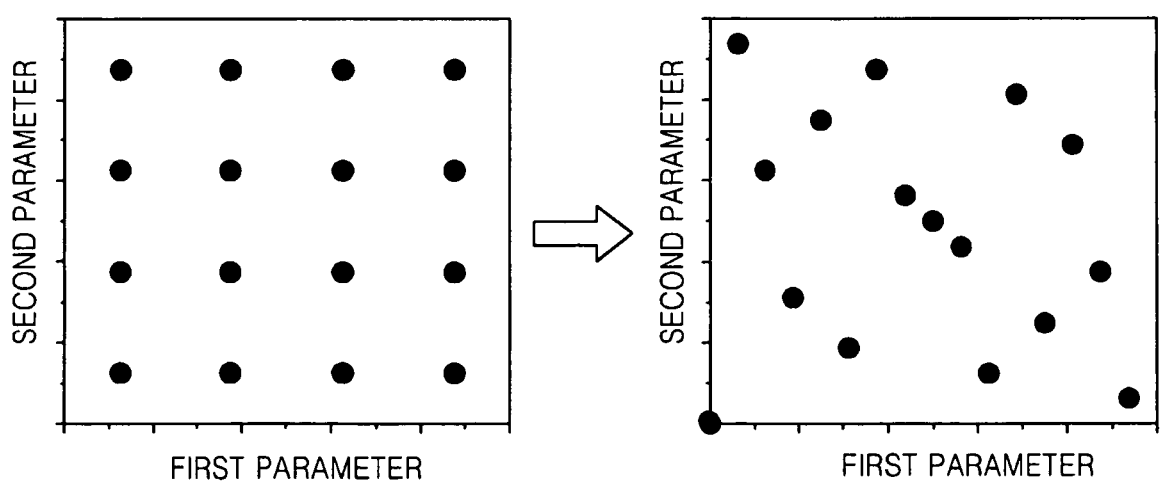
FIG. 4 is diagrams for comparing a uniform grid point and a pseudo-random point in a Monte Carlo method.

FIG. 4 illustrates the comparison of a uniform grid point and a pseudo-random point in a Monte Carlo method, according to an exemplary embodiment of the present invention. The left diagram of FIG. 4 illustrates uniform grid points and the right diagram of FIG. 4 illustrates the first sixteen points according to a pseudo-random sequence.

When the uniform grid points are used, despite sixteen attempts of the Monte Carlo method, only four other values are examined for a first parameter (and a second parameter). However, when the pseudo-random sequence is used, sixteen different values are examined for a first parameter (and a second parameter) by sixteen attempts. In other words, when the pseudo-random points are used, different values of the first parameter and the second parameter can be sufficiently checked in regards to sixteen values. Specifically as the number of parameters increases, it is advantageous to use the pseudo-random sequence rather than the uniform grid points in the Monte Carlo method.

The Monte Carlo method is used to provide efficiency in solving problems that occur while optimizing data transform.

<Third Step: Lemer Pseudo-Random Numbers>

Several methods of generating a pseudo-random sequence exist, and one of the most efficient methods is performed by using the Lemer number. The Lemer pseudo-random sequence is an artificially generated sequence, and has the closest characteristic to actual random numbers which are uniformly distributed. An algorithm for generating a Lemer sequence is well known, and thus a detailed description thereof will be omitted herein. In the exemplary embodiments of the present invention, at least $10^{13}$ unrepeated points should be provided. Since the Lemer sequence is an artificial sequence wherein its generation algorithm is well known, a decoder can easily recalculate the Lemer sequence.

By using the Lemer sequence, a group of parameters, i.e. angle parameters can be coded by using one piece of information, i.e. a number on a random sequence.

One random point is generated from each 6-dimensional (6D) or 12-dimensional (12D) parameter domain, and the optimum point is selected after measuring a compression rate by performing compression using the generated random points. Instead of storing or transmitting the group of optimum parameters, a number, corresponding to the location where the optimum point is generated on the Lemer sequence, can be stored or transmitted.

If $2^p$ points are examined in the Monte Carlo method, information of p bits is considered as overhead.

<Fourth Step: Localization of Diapason for Optimal Angle Parameters>

It has been discovered that the optimal rotation angle has a value near 0° or 180° (π radian). This shows that the DCT basis has already been almost optimized.

Accordingly, the angle parameters of the exemplary embodiments of the present invention only perform the partial exchange between rows and columns (in case of a Euler angle, an angle near 0°), or performs the partial exchange and modification of a sign of a basis element (in case of an Euler angle, an angle near 180°).

In other words, diapason of used parameters is limited to a certain region of a domain, and this is called localization.

By performing localization in regards to a diapason of a parameter, the number of overhead bits can be decreased. Assuming that a point that is to be examined is limited to a certain region in FIG. 4, it can be seen that an area that is to be examined is reduced. As the number of points that is to be examined per a unit area increases, the compression rate improves. However, when the localization is applied, it can be seen that the number of points that is to be examined decreases to improve the same compression rate.

Also, when the number of points that is to be examined is fixed, i.e. when the number of bits used as overhead is fixed, the compression rate can increase more since more points can be examined per a unit area by applying the localization.

<Fifth Step: Quasi-Optimal Basis>

By performing the first through fourth steps, it is possible to select the optimal basis for all blocks (a 4×4 block or an 8×8 block). In a high bit rate, overhead of 8 bytes or 10 bytes can be added per block. In a low bit rate, the quasi-optimal basis may be selected.

The quasi-optimal basis denotes that the same rotation is applied to entire blocks or parts of blocks included in one macroblock or one frame.

When the optimal rotation is applied to each block, the compression rate of an image may increase, but overhead also increases.

It can be determined whether the same rotation is to be applied to at least one block, a group of blocks, one macroblock, or one frame through various experiments.

In the low bit rate, the values of quantization coefficients are 0 in most parts of blocks after the rotation. Accordingly, additional information about rotation angle values of such blocks is not required to be transmitted.

Figure 5:
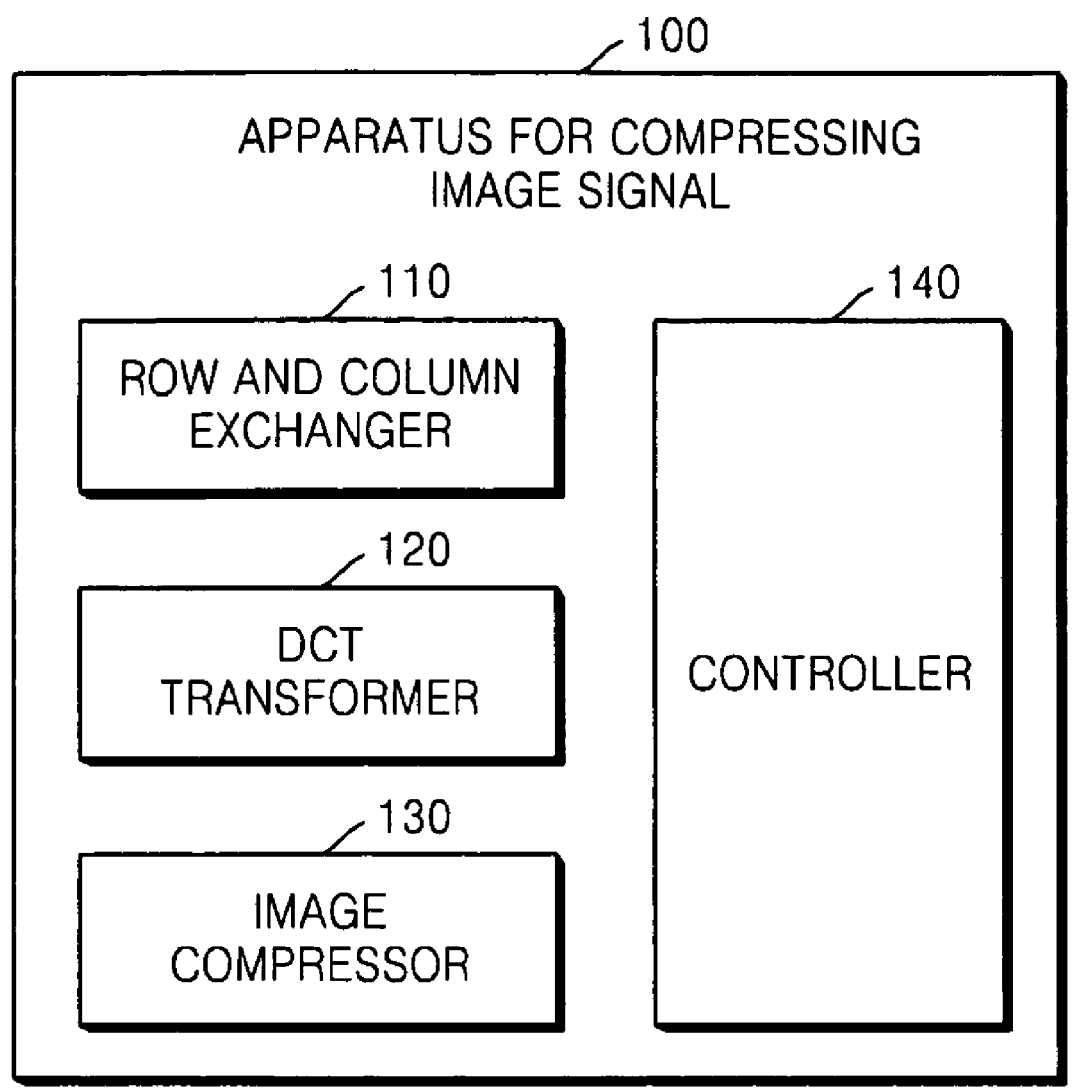
FIG. 5 is a block diagram illustrating an apparatus for compressing an image signal, according to an exemplary embodiment of the present invention.

FIG. 5 is a block diagram illustrating an apparatus 100 for compressing an image signal, according to an exemplary embodiment of the present invention. Referring to FIG. 5, the apparatus 100 includes a row and column exchanger 110, a DCT transformer 120, an image compressor 130, and a controller 140.

The row and column exchanger 110 performs partial exchanges between rows and columns of a DCT matrix. As shown in Equation 3, the row and column exchanger 110 multiplies a matrix $R_{horizontal}$, which corresponds to a partial exchange between rows, to the left of the DCT matrix, and a matrix $R_{vertical}$, which corresponds to a partial exchange between columns, to the right of the DCT matrix, but the operations of the row and column exchanger 110 is not limited thereto, and thus, the row and column exchanger 110 may perform the partial exchanges through other forms.

The DCT transformer 120 DCT-transforms an image signal that is to be compressed by using the DCT matrix in which the partial exchanges have been performed. Such operation is as defined by Equation 5 below.

$$Y = D' \times S \times D'^T \qquad \text{Equation 5}$$

In Equation 5, D' denotes a modified DCT matrix, S denotes a matrix of an image signal that is to be compressed, and Y denotes a DCT-transformed image signal.

The image compressor 130 compresses the DCT-transformed image signal.

The controller 140 selects an angle parameter corresponding to the highest compression rate by repeating the operations of the row and column exchanger 110, the DCT transformer 120, and the image compressor 130 (hereinafter, referred to as "repetition operations") by applying several values to the angle parameter.

The controller 140 performs the repetition operations for a plurality of angle parameters by using a Monte Carlo method, and selects an angle parameter corresponding to the highest compression rate.

Accordingly, the controller 140 generates a random sequence in regard to the angle parameter, obtains the compression rate for the image signal by performing the repetition operations for each value of the random sequence, and selects a value of the angle parameter that has the highest compression rate.

Also, in order to reduce overhead, the controller 140 obtains a number, i.e. location, on the random sequence of a value of the angle parameter corresponding to the highest compression rate, and stores or transmits the corresponding compressed image signal and the number on the random sequence to a decoder, instead of directly storing or transmitting the value of the angle parameter.

As described above, the random sequence may be the Lemer pseudo-random number.

Figure 6:
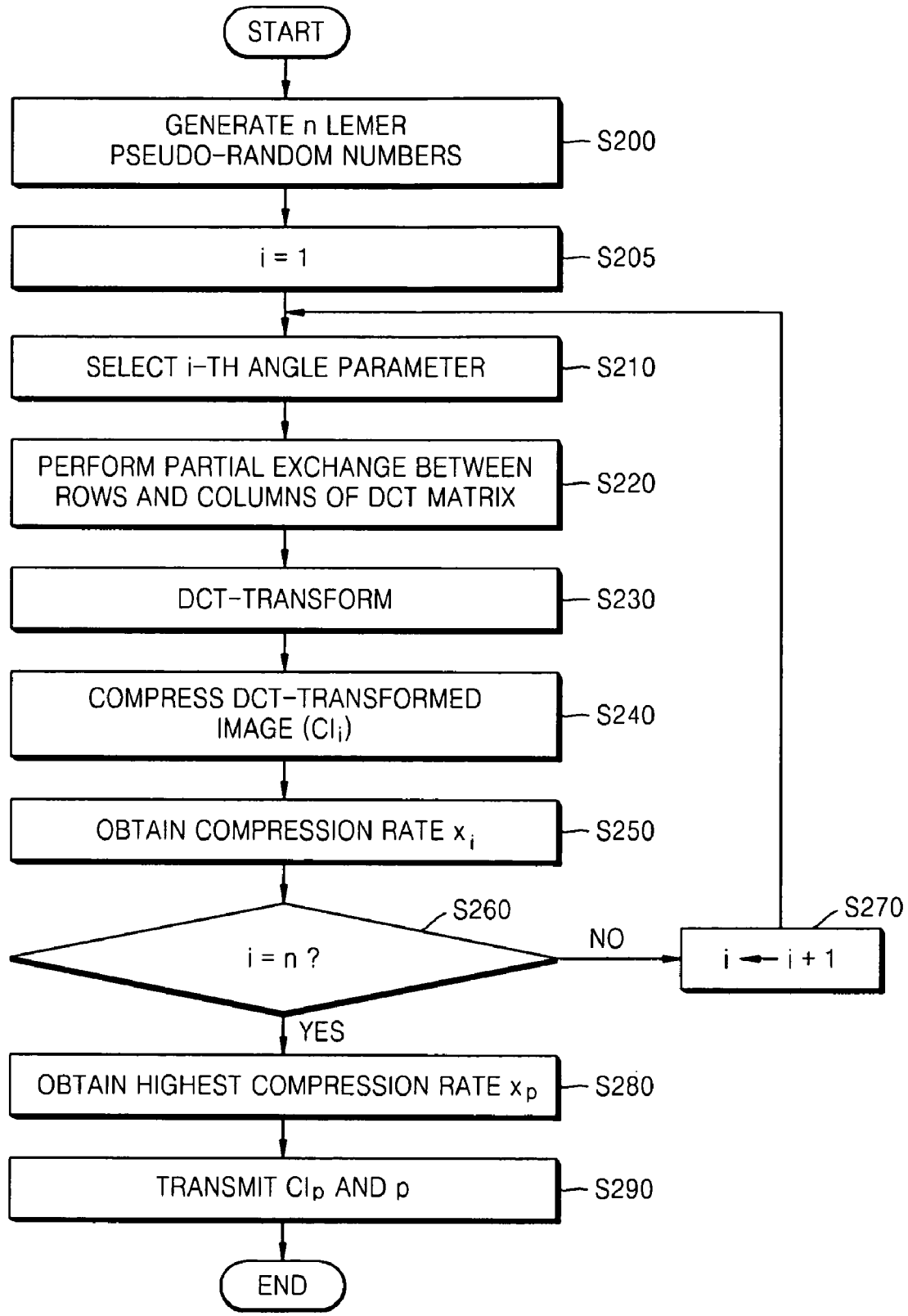
FIG. 6 is a flowchart illustrating a method of compressing an image signal according to an exemplary embodiment of the present invention.

FIG. 6 is a flowchart illustrating a method of compressing an image signal, according to an exemplary embodiment of the present invention.

First, in operation S200, a Lemer pseudo-random number is generated. It is assumed that the number of points that are to be examined is n, where n is a natural number.

The following operations are repeated by substituting 1 through n for a variable i.

First, 1 is substituted for the variable i, in operation S205.

An i-th angle parameter is selected from a Lemer pseudo-random sequence, in operation S210. A partial exchange between rows and columns of a DCT matrix is performed in operation S220, by using the selected i-th angle parameter, as described with reference to Equation 3 above.

By using the modified DCT matrix D', the image signal S is DCT-transformed, in operation S230, as described with reference to Equation 5 above.

The DCT-transformed image Y is compressed so as to generate a compressed image $CI_i$, in operation S240, and a compression rate $x_i$ is obtained, in operation S250.

Then, it is determined whether the i-th angle parameter is an n-th point, in operation S260. If all n points are not examined, in operation S260, the next location on the Lemer random sequence is appointed by adding 1 to i, in operation S270, and then, operations S210 to S260 are repeated.

Otherwise, if the compression rates for all n points are obtained, in operation S260, p, which has the highest compression rate $x_p$, is obtained, in operation S280, and $CI_p$ and p are stored or transmitted to the decoder, in operation S290.

The exemplary embodiments may provide one or more of the following advantages,

1. The exemplary embodiments of the present invention are based on a strong mathematical basis.

Figure 7:
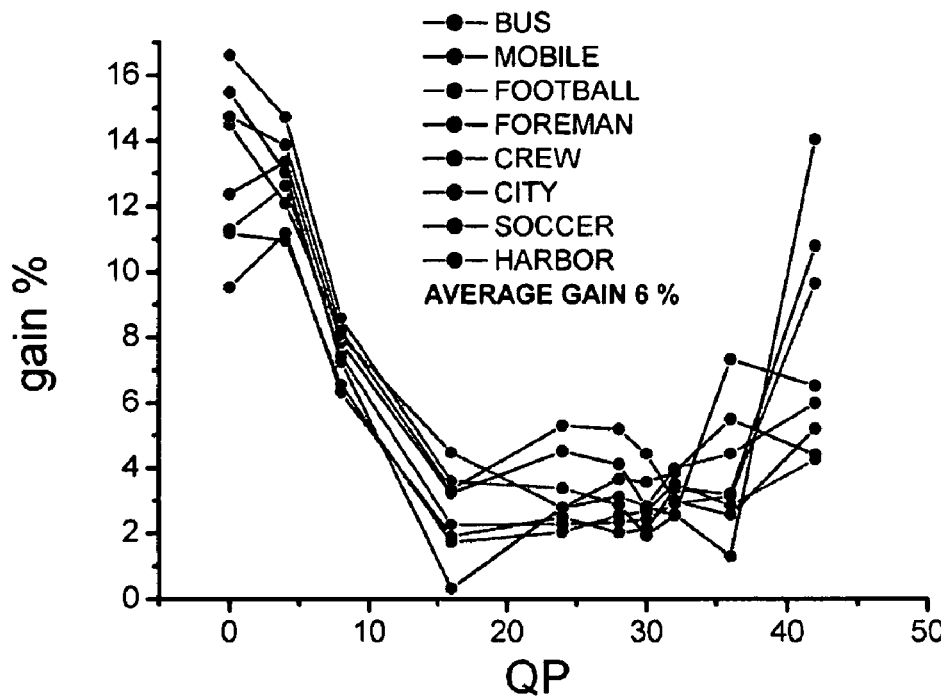
FIGS. 7 and 8 are graphs showing an increase of compression rate according to exemplary embodiments of the present invention.
Figure 8:
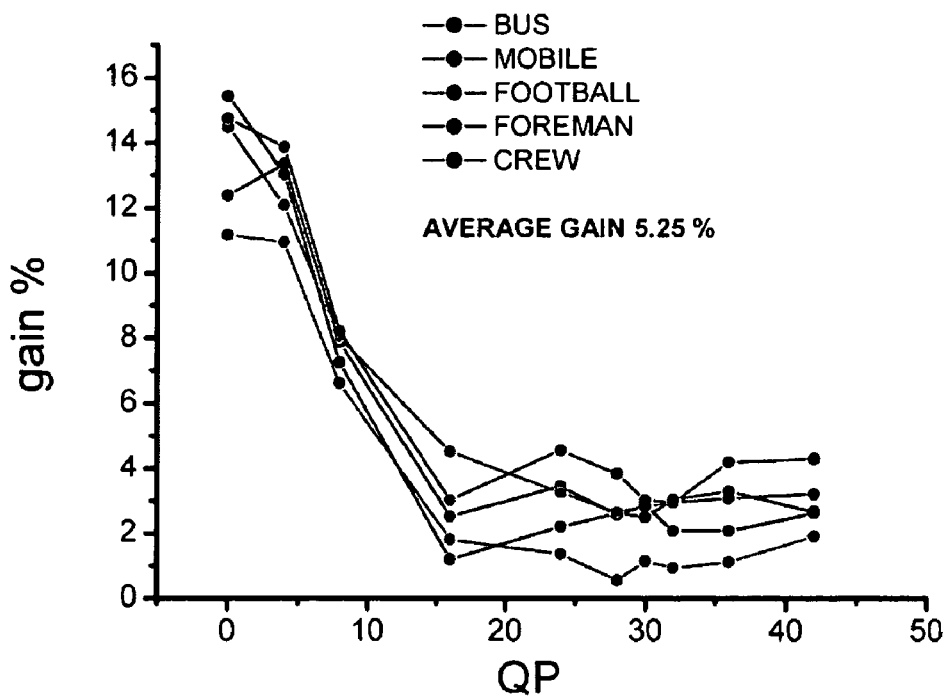

2. According to the method of the current exemplary embodiments of the present invention, a gain increases by 6% on average and in the low bit rate, a gain increases by a maximum of 16%. Referring to FIGS. 7 and 8, the compression rate increases by an average of 6% in the case of an 8×8 block, and by an average of 5.25% in the case of a 4×4 block in regards to various QPs and test video sequences.

3. When the present invention is applied, a value of a peak signal-to-noise ratio (PSNR) is very high, maybe up to 100 dbs. Accordingly, a lossless video coding is possible.

4. A Quantization Error can be Significantly Reduced.

ALTERNATIVE EXEMPLARY EMBODIMENTS

In the above exemplary embodiment of the present invention, a Euler angle is used as a parameter in orthogonal transform. However, as described above, the parameter is not limited to an Euler angle.

Also, a technology of expressing a group of parameters in one integer is not only applied to a rotation of the basis, but also to other methods that require conversion of additional information.

Excluding overhead, the highest increase of the compression rate that can be obtained by rotating the basis is approximately 20%. However, due to an addition of overhead, the compression rate increases approximately by 6%. Accordingly, by reducing overhead, the compression rate can be increased by approximately 20%.

According to the method and apparatus for compressing an image signal, while improving the compression rate of an image signal, overhead can be reduced by using a method of compressing a parameter for modifying a transform matrix. Accordingly, the amount of data that needs to be stored or transmitted to a decoder is reduced.

The present invention can also be embodied as computer readable codes on a computer (including all apparatuses having an information processing function) readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, and optical data storage devices.

While this invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of compressing an image signal, the method comprising:
    performing a partial exchange between rows and columns of a transform matrix;
    transforming the image signal that is to be compressed by using the transform matrix in which the partial exchange has been performed;
    compressing the transformed image signal; and
    selecting an angle parameter corresponding to a highest compression rate by repeating the performing the partial exchange, the transforming the image signal, and the compressing the transformed image signal, by applying several values to angle parameters showing extents the partial exchanges between the rows and columns of the transform matrix.

2. The method of claim 1, wherein the angle parameter is a Euler angle.

3. The method of claim 1, wherein the performing the partial exchange comprises multiplying a matrix corresponding to the partial exchange between rows to a left side of the transform matrix, and multiplying a matrix corresponding to the partial exchange between columns to a right side of the transform matrix.

4. The method of claim 3, wherein the matrix corresponding to the partial exchange between rows is $$\begin{bmatrix} A & B & C & 0 \\ D & E & F & 0 \\ G & H & I & 0 \\ 0 & 0 & 0 & 1 \end{bmatrix},$$

where A=cos α cos γ−sin α cos β sin γ, B=−sin α cos γ−cos α cos β sin γ, C=sin β sin γ, D=cos α sin γ+sin α cos β cos γ, E=−sin α sin γ+cos α cos β cos γ, F=−sin β cos γ, G=sin α sin β, H=cos α sin β, and I=cos β, and α, β, and γ are Euler angles.

5. The method of claim 1, wherein the selecting the angle parameter corresponding to the highest compression rate comprises:

generating a random sequence with regard to the angle parameter;

obtaining a compression rate of the image signal by performing the partial exchange between the rows and columns, the transforming of the image signal, and the compressing of the transformed image signal on each value of the random sequence;

obtaining the highest compression rate from among the obtained compression rates of each value of the random sequence; and selecting a value of the angle parameter corresponding to the highest compression rate.

6. The method of claim 5, further comprising:

obtaining a number of the value of the angle parameter corresponding to the highest compression rate in the random sequence; and storing or transmitting the image signal compressed by the highest compression rate and a corresponding number in the random sequence to a decoder.

7. The method of claim 5, wherein the generated random sequence is a Lemer pseudo-random number.

8. The method of claim 1, wherein the selecting of the angle parameter corresponding to the highest compression rate comprises repeating the performing of the partial exchange, the transforming the image signal, and the compressing of the transformed image signal by using a Monte Carlo method.

9. The method of claim 2, wherein the Euler angle has a value near 0° or near 180°.

10. An apparatus for compressing an image signal, the apparatus comprising:

a row and column exchanger which performs a partial exchange between rows and columns of a transform matrix;

a transformer which transforms the image signal that is to be compressed by using the transform matrix in which the partial exchange has been performed;

an image compressor which compresses the transformed image signal; and a controller which selects an angle parameter corresponding to a highest compression rate by repeating the operations of the row and column exchanger, the transformer, and the image compressor, by applying several values to angle parameters showing extents of the partial exchanges between the rows and columns of the transform matrix.

11. The apparatus of claim 10, wherein the angle parameter is a Euler angle.

12. The apparatus of claim 10, wherein the row and column exchanger multiplies a matrix corresponding to the partial exchange between rows to a left side of the transform matrix, and multiplies a matrix corresponding to the partial exchange between columns to a right side of the transform matrix.

13. The apparatus of claim 12, wherein the matrix corresponding to the partial exchange between rows is $$\begin{bmatrix} A & B & C & 0 \\ D & E & F & 0 \\ G & H & I & 0 \\ 0 & 0 & 0 & 1 \end{bmatrix},$$

where A=cos α cos γ−sin α cos β sin γ, B=−sin α cos γ−cos α cos β sin γ, C=sin β sin γ, D=cos α sin γ+sin α cos β cos γ, E=−sin α sin γ+cos α cos β cos γ, F=−sin β cos γ, G=sin α sin β, H=cos α sin β, and I=cos β, and α, β, and γ are Euler angles.

14. The apparatus of claim 10, wherein the controller generates a random sequence with regard to the angle parameter, obtains a compression rate of the image signal by operating the row and column exchanger, the transformer, and the image compressor for each value of the random sequence, obtains the highest compression rate from among the obtained compression rates of each value of the random sequence, and selects a value of the angle parameter corresponding to the highest compression rate.

15. The apparatus of claim 14, wherein the controller obtains a number of the value of the angle parameter corresponding to the highest compression rate in the random sequence, and stores or transmits the image signal compressed by the highest compression rate and a corresponding number in the random sequence to a decoder.

16. The apparatus of claim 14, wherein the generated random sequence is a Lemer pseudo-random number.

17. The apparatus of claim 10, wherein the angle parameter corresponding to the highest compression rate is selected by repeating the operations of the row and column exchanger, the transformer, and the image compressor by using a Monte Carlo method.

18. The apparatus of claim 11, wherein the Euler angle has a value near 0° or near 180°.

19. A computer readable recording medium having recorded thereon a program for executing a method of compressing an image signal, the method comprising:

performing a partial exchange between rows and columns of a transform matrix;

transforming the image signal that is to be compressed by using the transform matrix in which the partial exchange has been performed;

compressing the transformed image signal; and selecting an angle parameter corresponding to a highest compression rate by repeating the performing of the partial exchange, the transforming of the image signal, and the compressing of the transformed image signal, by applying several values to angle parameters showing extents of the partial exchanges between the rows and columns of the transform matrix.

20. The method of claim 1, wherein the transform matrix is a discrete cosine transform (DCT) matrix.

21. The apparatus of claim 10, wherein the transform matrix is a discrete cosine transform (DCT) matrix.

* * * * *